United States Patent [19]

Baron

[11] Patent Number: 4,843,381
[45] Date of Patent: Jun. 27, 1989

[54] FIELD SEQUENTIAL COLOR LIQUID CRYSTAL DISPLAY AND METHOD

[75] Inventor: Yair Baron, Southfield, Mich.

[73] Assignee: Ovonic Imaging Systems, Inc., Troy, Mich.

[21] Appl. No.: 274,638

[22] Filed: Nov. 16, 1988

Related U.S. Application Data

[63] Continuation of Ser. No. 834,085, Feb. 26, 1986, abandoned.

[51] Int. Cl.$^4$ .............................................. G09G 3/36
[52] U.S. Cl. .................................. 340/784; 340/702; 350/339 F
[58] Field of Search ............... 340/784, 783, 702, 703, 340/716; 350/333, 339 F, 339 D; 358/236

[56] References Cited

U.S. PATENT DOCUMENTS 4,294,524  10/1981  Stolov ................................ 340/784
4,384,763  5/1983   Russo ................................ 350/333

FOREIGN PATENT DOCUMENTS 0187318   10/1984  Japan ................................. 340/784
0189317   10/1984  Japan ................................. 340/784
2024443   1/1980   United Kingdom ................ 340/784
2130781   6/1984   United Kingdom ................ 350/333

Primary Examiner—David K. Moore
Assistant Examiner—Alvin Oberley
Attorney, Agent, or Firm—Kenneth M. Massaroni; Marvin S. Siskind; Richard M. Goldman

[57] ABSTRACT

There is disclosed a system, display, and method for providing a full color image from a plurality of primary colors. A liquid crystal display including a plurality of pixels arranged in rows is addressed by addressing means for addressing the rows of pixels continuously and sequentially. Data input means applies operating potentials to selected ones of the pixels as the pixels are addressed to cause the display to provide continuously progressing sequential image fields with each one of the image fields corresponding to a respective one of the primary colors. A light projecting means projects light fields of the primary colors onto the liquid crystal display in sequence with and in substantially following progression with the image fields.

8 Claims, 3 Drawing Sheets

FIELD SEQUENTIAL COLOR LIQUID CRYSTAL DISPLAY AND METHOD

This application is a continuation of application Ser. No. 834,085, filed on Feb. 26, 1986, now abandoned.

FIELD OF THE INVENTION

The present invention generally relates to a display, system, and method for providing a full color image from a plurality of primary colors and more particularly to such a system including a liquid crystal display which provides sequential image fields through which the primary colors are projected.

BACKGROUND OF THE INVENTION

In recent years there has been considerable effort to provide full color display systems which do not rely upon the conventional color cathode ray tube. The elimination of cathode ray tubes for systems such as television receivers, computer monitors, and the like, has been prompted for many reasons.

Conventional cathode ray tubes are large in size and thus occupy a considerable portion of the cabinetry in which they and their associated circuitry are housed. Also, because thick glass walls are used to form the enclosures of the cathode ray tubes, they are generally quite heavy accounting for an inordinate proportion of the overall weight of a television receiver or monitor. In addition, cathode ray tubes include an elongated neck portion to permit the acceleration of an electron beam from an electron gun to the cathode ray tube faceplate and hence, are irregular in shape.

In addition to the problems posed by the physical characteristics of conventional cathode ray tubes, the electrical requirements of conventional cathode ray tubes can also pose problems. Cathode ray tubes require a high voltage power supply to obtain sufficient acceleration of the electron beam to sustain the operation of the cathode ray tubes. Such power supplies can require transformers and other circuit components which add to the weight and size of the systems in which they are employed. The high voltage also creates an obvious safety hazard. In addition, compensating components are required to correct for nonlinear operation of the tubes and shielding is also required to prevent external magnetic fields from adversely effecting the desired path of the electron beam. Without such compensating and shielding components, distorted images would result.

While cathode ray tubes have changed very little over the years in terms of their physical characteristics and electrical requirements, there have been significant advances in the area of circuit development. Circuits are now more compact, capable of operating at lower currents, and hence are more portable than ever before. In short, cathode ray tubes have fallen out of step with circuit development due to their lack of portability and flexibility of application.

One system which has been proposed to eliminate the color cathode ray tube includes a back illuminated liquid crystal display having a plurality of pixels arranged in plural groups of three pixels. Each pixel of each group includes a color filter of a respective one of the primary colors, such as, for example, red, green, and blue. The pixels of each color are scanned together such that all of the red pixels are scanned, all of the green pixels are scanned, and all of the blue pixels are scanned simultaneously. The red, green, and blue pixels are scanned at a fast rate to present full color image fields in sequence for each frame. The frame rate is fast enough so that the human eye can integrate all of the colors and intensities together. As a result, a full color, moving display is obtained.

The system mentioned above suffers from two primary draw backs. Resolution is poor because the color pixels are of finite dimension and three separate color pixels are required to constitute one complete picture element of the display. Also, because pixels are of small dimension and of each primary color must be integrated together, the processing for making the display is extremely difficult.

Other systems have been proposed but each has not found commercial acceptance. These systems suffer from lack of resolution, lack of brightness, or are too complex to represent a sufficient economic advantage over the conventional color cathode ray tube.

SUMMARY OF THE INVENTION

The invention provides a display for providing a full color image from a plurality of primary colors. The display includes a liquid crystal display including a plurality of pixels arranged in rows, the rows of pixels being continuously sequentially addressable for providing continuously progressing sequential image fields, each image field corresponding to one of the primary colors, and light projecting means for projecting onto the liquid crystal display light fields of the primary colors in sequence and in substantially following progression with the image fields.

The invention further provides a system for providing a full color image from a plurality of primary colors. The system includes a liquid crystal display including a plurality of pixels arranged in rows, and addressing means for addressing the rows of pixels continuously and sequentially. The system further includes data input means for applying operating potentials to selected ones of the pixels as the pixels are addressed to cause the display to provide continuously progressing sequential image fields, each one of the image fields corresponding to a respective one of the primary colors, and light projecting means for projecting onto the liquid crystal display light fields of the primary colors in sequence with and in substantially following progression with the image fields.

The invention still further provides a method of displaying a full color image including the steps of providing a liquid crystal display including a plurality of pixels arranged in rows, continuously and sequentially addressing the rows of pixels to provide continuously progressing sequential image fields with each image field corresponding to one of a plurality of primary colors, and projecting onto the liquid crystal display light fields of the primary colors in sequence and in substantially following progression with the image fields.

DETAILED DESCRIPTION

Figure 1:
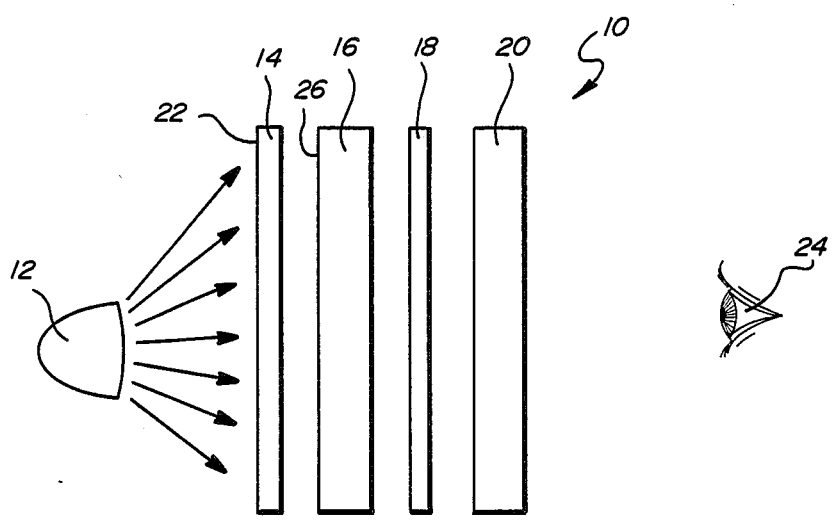
FIG. 1 is an exploded side view schematically illustrating a full color image display embodying the present invention.

Referring now to FIG. 1, it illustrates a full color image display 10 embodying the present invention. The display 10 generally includes a light source 12, a first light diffuser 14, a color liquid crystal display 16, a second light diffuser 18, and a black and white liquid crystal display 20.

The light source 12 is preferably a high intensity lamp arranged to uniformly illuminate the entire surface 22 of the first light diffuser 14. The lamp 12 is also preferably of the type which emits essentially white light so as to illuminate the first light diffuser 14 with light having a broad range of wavelength components. This enables enhanced color balance in the final full color image provided by the display and which is detectable by the human eye indicated at 24. Alternatively, other forms of light sources can be utilized. For example, a cluster of three light sources, each being arranged to emit light of one of the primary color wavelengths can be used in place of the single lamp 12.

The first light diffuser 14 is provided to diffuse the light received from the light source 12 and to thus evenly distribute the light over the light incident surface 26 as will be described in greater detail hereinafter, the color liquid crystal 16 includes plural sets of color filters arranged in horizontal lines or stripes across the display 16 and wherein each set of filters include at least one filter corresponding to each respective one of a plurality of primary colors such as, for example, red, green, and blue. The display 16 is also of the type wherein each of the color filters is associated with a liquid crystal display pixel which is normally opaque but which is rendered light transmissive upon the application of operating potentials thereto. As a result, upon selective energization of the pixels of the display 16, the display 16 will project light fields of the primary colors on a line by line basis for each color in sequence onto the black and white liquid crystal display 20 through the second light diffuser 18.

The black and white liquid crystal display 20 is arranged to provide image fields for the display and as a result, intensity modulates the primary colors projected thereon by the color liquid crystal display 16. As will be described in greater detail hereinafter, the black and white liquid crystal display 20 is a relatively high resolution display including a plurality of pixels arranged in rows and columns. The rows of the pixels are continuously sequentially addressable for providing continuously progressing sequential or scrolling image fields with each image field corresponding to one of the primary colors. The black and white liquid crystal display 20 is preferably driven to provide sixty frames of video per second wherein each frame includes three image fields, each image field corresponding to one of the primary colors. As a result, the image field rate is fast enough to enable the human eye to integrate the light intensity modulated color image fields together to detect a full color image, and the frame rate is fast enough to enable the human eye to discern continuous and uninterrupted movement in the displayed image.

Figure 2:
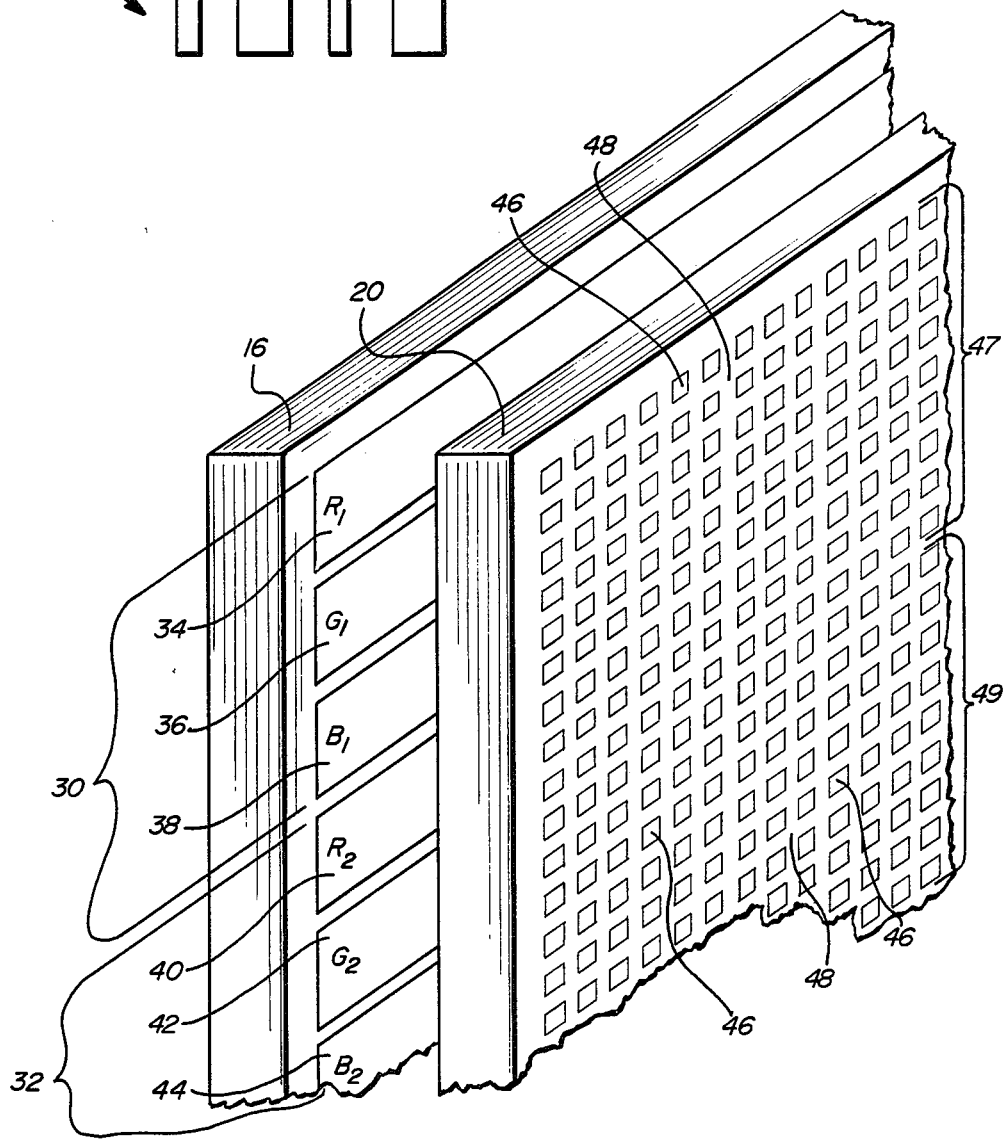
FIG. 2 is a partial exploded perspective view to an enlarged scale illustrating in greater detail a color liquid crystal display for providing fields of primary colors and a black and white liquid crystal display for providing image fields corresponding to the fields of primary colors in accordance with the present invention.

Referring now to FIG. 2, it illustrates the color liquid crystal display 16 and the black and white liquid crystal display 20 in greater detail. It will be noted that, for the sake of simplicity, the second light diffuser 18 is not included in FIG. 2.

As can be noted in FIG. 2, the color liquid crystal display 16 includes a plurality of sets of color filters, such as color filter sets 30 and 32. Each set of color filters includes a color filter corresponding to each respective one of the primary colors, for example, red, green, and blue. To that end, color filter set 30 includes a red color filter 34, a green color filter 36, and a blue color filter 38. Similarly, color filter set 32 includes a red color filter 40, a green color filter 42, and a blue color filter 44. The color filters 34 through 44 are arranged in rows and extend across the entire extent of the display. As previously explained, each of the color filters is associated with a pixel which is normally opaque but which is rendered light transmissive when selectively energized.

The black and white liquid crystal display 20 includes a plurality of pixels 46 which are spaced apart and arranged in lines or rows and columns. As can be noted from the figure, the black and white liquid crystal display 20 is of high resolution as compared to the color liquid crystal display 16. For example, the pixels 46 of the black and white liquid crystal display 20 can be dimensioned such that three consecutive rows of the pixels 46 will represent a height dimension approximately equal to the height dimension of one of the color filters 34 through 44. Also, the liquid crystal display 20 is preferably of the type which includes polarizers (not shown in FIG. 2) so that the pixels 46 are normally opaque and rendered light transmissive in response to the selective application of operating potentials thereto. Also, the areas 48 surrounding each of the pixels 46 are opaque to light. The areas 48 can be made opaque to light by the polarizers of the liquid crystal display 20. The black and white liquid crystal display 20 can be of the type disclosed in, for example, copending U.S. patent applications Ser. Nos. 573,004 and 675,941, filed Jan. 23, 1984 and Dec. 3, 1984 respectively, in the names of Zvi Yaniv, Vincent D. Cannella, Gregory L. Hansell, and Louis D. Swartz, for Liquid Crystal Displays Operated By Amorphous Silicon Alloy Diodes, which copending applications are incorporated herein by reference.

When a pixel of the color liquid crystal display is energized, the light projected through its corresponding filter will be somewhat diffused and impinge upon plural rows of the pixels 46 of the black and white liquid crystal display 20. Preferably the second light diffuser 18 is interposed between the color liquid crystal display 16 and the black and white liquid crystal display 20, and the light passing through the pixel of the color display is further diffused. In accordance with this preferred embodiment, nine such rows of pixels 46 are preferably illuminated by the light projected through each of the color filters. As can be appreciated by those skilled in the art, the ratio of nine rows of pixels to each color filter is only exemplary and that other ratios can be utilized as well without departing from the present invention. The second light diffuser 18 not only spreads the light projected through the color filters, but in addition, assures that the light projected onto the plural rows of pixels 46 is of substantially uniform intensity.

In operation and as previously mentioned, the color liquid crystal display 16 and the black and white liquid crystal display 20 provide sixty frames of color video per second having three image fields per frame, with each image field corresponding to a respective one of the primary colors. Unlike previous systems wherein each entire image field is displayed at once for a time, the display of FIG. 2 provides continuously progressing sequential-al or scrolling primary color image fields. Hence, the black and white liquid crystal display provides continuously progressing sequential image fields and the color liquid crystal display forms a light projection means which projects light fields of their primary colors in sequence and in substantially following progression with the image fields.

Each new image field starts at the top of the display 10 and replaces the immediately preceeding image field on a "line by line" basis. As a result, the transition region or line between image fields moves downwardly on the display 10. This is accomplished by driving the black and white liquid crystal display pixels of each row with new video information in parallel while addressing the rows one at a time in succession. The liquid crystal color display is driven in a similar manner wherein the pixels associated with the new color filters are energized in a progression which preferably follows or is slightly behind the progression of image fields applied to the rows of pixels of the black and white liquid crystal display. However, the pixels of the color liquid crystal display are energized at a rate which is one-ninth the rate of energization of the pixels of the black and white liquid crystal display, because each color filter illuminates nine rows of pixels of the black and white liquid crystal display in the preferred embodiment. Also, at the transition line between image fields, the color pixels associated with the rows of black and white pixels being updated are preferably all temporarily turned off so that the new color appears only after all of the rows of the black and white liquid crystal display pixels associated with these color pixels have been provided with the new video information. If one of the color pixels were left on during the updating of the associated black and white pixels, very brief and possibly incorrect light patterns might result. In a preferred operating method, the color filters are temporarily turned off one set at a time.

As an example of the foregoing, and assuming that the display is currently displaying an entire red image field, the color liquid crystal display pixel associated with the red color filter 34 is turned off. The first nine rows of pixels of the black and white liquid crystal display 20, indentified in FIG. 2 as group 47, are then sequentially addressed and, as each row is addressed, the pixels of each row receive in parallel new video information corresponding to the next image field which will be green, for example. After the first nine rows of the black and white liquid crystal display pixels are driven and held in their new transmissive or opaque state, the pixel associated with the green color filter 36 is energized. Also, at this time, the pixel associated with the red filter 40 is turned off and rendered opaque. At this point in time, the first nine row group 47 of the display contains the beginning of a new green image field, the next nine row group 49 is opaque, and the remainder of the display contains the rest of the immediately preceeding red image field.

Next, the rows in the second nine row group 49 of black and white liquid crystal display pixels are addressed in sequence and the pixels of each row receive new green image field video information in parallel. After the second nine row group 49 of black and white display pixels have been driven, the color liquid crystal display pixel associated with the green color filter 42 is energized and the color liquid crystal display pixel corresponding to the next red filter is turned off. Now, the top eighteen rows of the display contain the new green image field, the next nine rows are blanked, and the rest of the display contains the rest of the immediately preceeding red image field.

The foregoing continues until the entire display contains the new green image field. Then, the color liquid crystal display pixel associated with the green color filter 36 is turned off and the nine rows of the black and white liquid crystal display pixels to be illuminated by the light to be projected through the blue filter 38 are addressed and driven. After these pixels of group 47 are driven, the color liquid crystal display pixel associated with the blue filter 38 is turned on and the color liquid crystal display pixels associated with the red filter 34 and the green filter 42 are kept off. As a result of the foregoing method, it can be seen that the black and white liquid crystal display pixels 46 are continuously sequentially addressable for providing scrolling image fields, or in other words, continuously progressing sequential image fields, with each image field corresponding to one of the primary colors, and that the liquid crystal color display 16 provides a light projecting means for projecting onto the black and white liquid crystal display light fields of the primary colors in sequence and in substantially following progression with the image fields.

Figure 3:
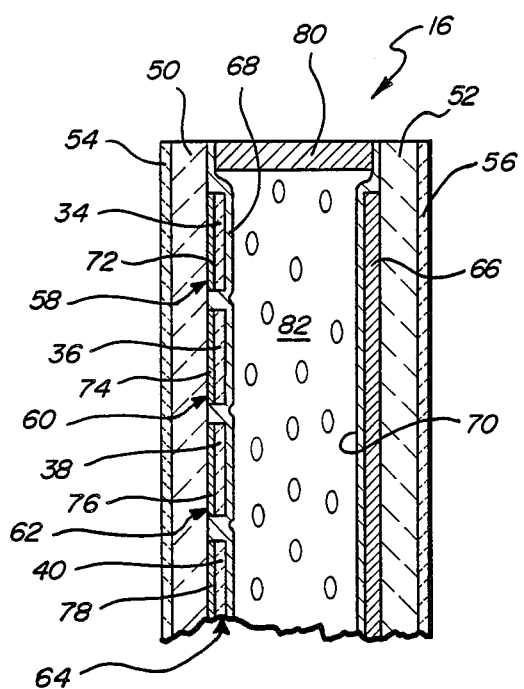
FIG. 3 is a partial cross-sectional side view of th color liquid crystal display of FIG. 2.

FIG. 3 is a partial cross-sectional side view illustrating the color liquid crystal display 16. in greater detail. The display 16 includes a pair of substrates 50 and 52, a pair of light polarizers 54 and 56, a plurality of color pixels 58, 60, 62, and 64, a common electrode 66, and a pair of alignment layers 68 and 70.

The substrates 50 and 52 are preferably formed from a light transmissive material which is also electrically insulating. Hence, the substrates 50 and 52 can be formed of glass, for example.

The polarizers 54 and 56 are disposed over the external surfaces of the substrates 50 and 52. Such polarizers are well known in the art.

Formed on the interior surface of the substrate 50 are the plurality of color pixels 58, 60, 62, and 64. Each such pixel includes an electrode 72, 74, 76, and 78 respectively and a color filter 34, 36, 38, and 40 respectively overlying the electrodes. Formed over all of the color pixels is the alignment layer 68.

Formed on the interior surface of the other substrate 52 is a common electrode 66. Formed over the common electrode is the other alignment layer 70.

The electrodes 72, 74, 76, 78, and 70 are preferably formed from a light transmissive conductive material. To that end, the electrodes can be formed from indium tin oxide, for example.

The substrates 50 and 52 are separated by a plurality of spacers, such as spacer 80, which are in between and linking the substrates 50 and 52. Within the space between the substrates and defined by the spacers 80, is liquid crystal material 82. The liquid crystal material 82 can be, for example, a twisted nematic liquid crystal material, or the fast switching liquid crystal material known as chiral smectic C which has been available commercially for at least several years. Such a material is well suited for this application because in order to obtain a high quality color image, three color fields are required during each 16.7 millisecond time period. As a result, the liquid crystal material should preferably exhibit a switching speed or rate of about 1 millisecond. Such a speed is well within the capability of chiral smectic C liquid crystal material.

As previously described with respect to FIG. 2, the color liquid crystal display 16 is structured such that the pixels thereof are normally opaque and are rendered light transmissive upon the application of suitable drive potentials. Also, as previously explained with reference to FIG. 2, the color filters 34, 36, 38, and 40 extend the entire width of the display in a stripe-like configuration and preferably extend at least coextensively with the rows of the black and white liquid crystal display pixels illustrated in FIG. 2. Hence, the electrodes 72, 74, 76, and 78 also extend across the display by the same extent.

Figure 4:
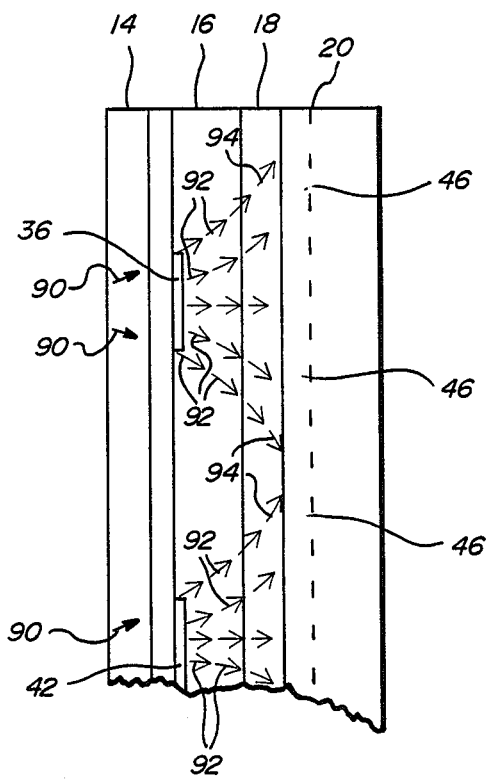
FIG. 4 is a schematic side view of the display of FIG. 1 illustrating the manner in which the primary colors are projected onto the black and white liquid crystal display in accordance with the embodiment of FIG. 1 of the present invention.

Referring now to FIG. 4, it illustrates the manner in which the light diffusers 14 and 18 diffuse the light which is projected through the color filters onto the black and white liquid crystal display 20. Here, the green color filters, for example, green color filter 36 and 42 are projecting light onto the black and white liquid crystal display 20. (To simplify FIG. 4, the red and blue color filters and various other components are not shown.)

The light from the light source 12 (not shown in FIG. 4) is first diffused by the first light diffuser 14 as indicated by the arrows 90. The light passes through the green color filters 36 and diverges therefrom as indicated by the arrows 92 by virtue of the initial scattering imparted to the light by the first light diffuser 14. When the light projected through the filters 36 and 42 impinges upon the second light diffuser 18, the light is further scattered as indicated by the arrows 94 so that a plurality of the black and white liquid crystal display pixels 46 are illuminated by the diverging green light emanating from the color filters 36 and 42. Here, the pixels 46 are illustrated as being rendered light transmissive by the application of suitable operating potentials.

As can be seen from FIG. 4, by virtue of the pair of light diffusers, the black and white liquid crystal display pixels 46 are uniformly illuminated. In addition, by virtue of the foregoing structural arrangement of the display 10, only the black and white liquid crystal display 20 need be of high resolution, and the color liquid crystal display 16 can have a much lesser resolution.

Figure 5:
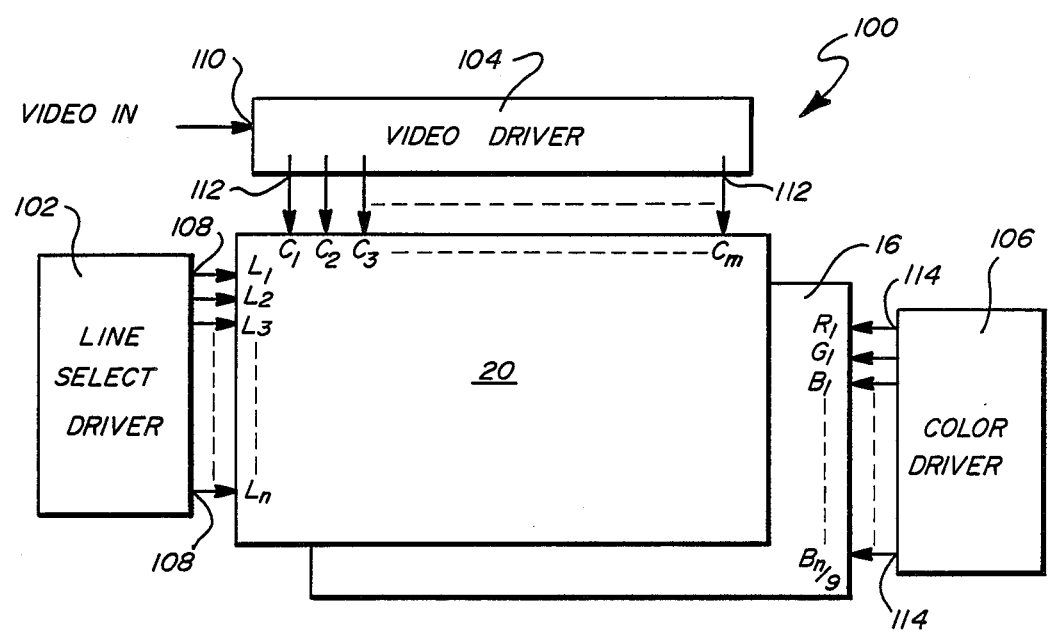
FIG. 5 is a block schematic diagram of a full color image display system embodying the present invention which includes the full color image display of FIG. 1.

Referring now to FIG. 5, it illustrates in schematic diagram form a system for providing a full color image which includes the display illustrated in FIG. 1. Hence, the system 100 includes the color liquid crystal display 16 and the black and white liquid crystal display 20. The displays 16 and 20 are shown offset for ease of illustration. The system 100 further includes a line select driver 102, a video driver 104, and a color driver 106.

The black and white liquid crystal display 20, as previously described, includes a plurality of pixels arranged in lines and columns. As illustrated in FIG. 5, the pixels of the black and white liquid crystal display 20 are arranged in $L_1$ through $L_n$ lines and $C_1$ through $C_m$ columns. Also as previously mentioned, the black and white liquid crystal display 20 is a high resolution display, and can include pixels arranged in, for example, four hundred (400) lines by six hundred and forty (640) columns. The line select driver 102 includes a plurality of outputs 108 with each output being coupled to a respective one of the lines of liquid crystal display pixels. The line select driver sequentially addresses the lines of pixels one at a time in succession and at a rate so that all of the lines are addressed three times during each frame. As previously mentioned, the lines are preferably selected at a rate which provides sixty frames of video per second. As also previously mentioned, each of the fields corresponds to one of the respective primary colors.

The video driver 104 includes an input 110 which receives the video information. The video driver also includes a plurality of outputs 112 with each output being coupled to a respective one of the display columns. The video driver 104 can also include a store associated with each of the outputs for temporarily storing the video information to permit the parallel driving of the columns as the lines are selected by the line select driver 102.

The color driver 106 includes a plurality of outputs 114. Each output 114 is coupled to a respective given one of the color pixels of the color liquid crystal display 16. The color driver 106 drives the color pixels as previously described so that the primary colors projected through the pixels provide light fields in sequence with and in substantially following progression with the image fields of the black and white liquid crystal display 20.

In view of the foregoing, it can be appreciated that the present invention provides a new and improved display, system, and method for providing a full color image from a plurality of primary colors and more particularly to a display, system, and method wherein a liquid crystal display is utilized to provide sequential image fields through which the primary colors are projected. The display and system of the present invention exhibits high resolution and brightness because each pixel of the black and white liquid crystal display 20 may be and typically is utilized in providing each of the image fields rather than just one-third of the pixels, as in some other systems. In addition, because the image fields are continuously progressing or scrolling down the display with a new image field replacing the immediately preceeding image field, the display is constantly illuminated. This significantly helps to avoid objectionable flicker in the displayed image. Moreover, it provides a technique for ensuring that each row of pixels is on for relatively the same length of time, and allows each row of the display 10 to be kept on for virtually the full portion of time allotted for each image field. Also, because the entire display is transmissive at all times, the display has relatively high brightness. As a result, the present invention provides a system which exhibits distinct advantages over prior art systems which have attempted to replace conventional color cathode ray tubes.

In addition to the foregoing, while a three primary color system has been disclosed herein as a preferred embodiment, those skilled in the art can appreciate that a two color system in accordance with the present invention has substantial value as well. A two color system would be able to produce a wide enough variation in color hues to a sufficient extent to render such a system useful for many applications.

I claim:

1. A liquid crystal display for providing a color image from a plurality of primary colors, said display comprising:
   a first image generating array of liquid crystal pixels arranged in a plurality of rows and columns, said pixels capable of being continuously and sequentially addressed for providing a continuously progressing sequence of frames of image fields, each frame including at least two image fields, each image field corresponding to a primary color;
   a second color-providing array of liquid crystal pixels, said second array including a plurality of substantially parallel, spacedly disposed, elongated pixel strips; each strip being substantially coextensive in length to one dimension of the first array and having one color filter associated therewith, each color filter corresponding to one of said primary colors, said pixel strips capable of being continuously and sequentially addressed for providing a continuously progressing sequence of primary color fields to said continuously progressing image fields;
   a first light diffuser operatively disposed between said image generating array and said color-providing array, said light diffuser adapted to diffuse colored light from a single strip of said second array over at least two rows of pixels of said first array; and
   a light source adapted to project uniform light onto said second array, thereby sequentially transmitting light fields of said primary colors onto the first light diffuser and the liquid crystal pixels of said first array in a continuously progressing sequence of image fields.

2. A display as defined in claim 1 wherein said pixels of said first and second arrays are normally opaque and responsive to applied operating potentials for being transmissive to light.

3. A display as defined in claim 2 wherein said pixels are spaced apart and wherein the spaces between said pixels are opaque.

4. A display as defined in claim 1 wherein said primary colors are red, green, and blue.

5. A display as defined in claim 1 wherein said color filters include at least one filter corresponding to each respective one of said primary colors.

6. A display as defined in claim 5 wherein said color filters comprise plural sets of said color filters, each said set of filters including at least one filter corresponding to each respective one of said primary colors.

7. A display as defined in claim 1, further including a second light diffuser, said second light diffuser disposed between said light source and said second array, on the side thereof opposite said first diffuser.

8. A display as defined in claim 1, wherein said first light diffuser is adapted to diffuse colored light from a single strip of said second array over at least nine rows of pixels of said first array.

* * * * *